United States Patent Office 3,173,907
Patented Mar. 16, 1965

3,173,907
QUATERNIZED N-ALKYLATED ARYLAZO-
IMIDAZOLES
Erwin Klingsberg, Mountainside, and Charles E. Lewis,
Somerville, N.J., assignors to American Cyanamid Company, New York, N.Y., a corporation of Maine
No Drawing. Filed Nov. 27, 1959, Ser. No. 855,537
6 Claims. (Cl. 260—157)

This invention relates to quaternized N-alkylated imidazolium azo dyes. More specifically, this invention relates to quaternized imidazole azo dyes of the structure:

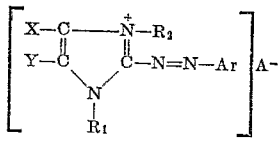

in which $R_1$ and $R_2$ are lower alkyl groups or cyanoalkyl groups, each of X and Y is hydrogen or lower alkyl, Ar is the residue of a diazotizable amine having in a position ortho or para to the azo linkage or conjugated with the latter through further azo bridges, an amino, alkylated amino, or alkoxy group, and A is an anion.

The polyacrylonitrile fibers, which have become increasingly useful articles of commerce, are difficult to dye. Most of the commercially available fibers of this type contain a major proportion of polyacrylonitrile, 85% or more. Few of the standard dyestuffs available show affinity for these high-acrylonitrile-content-fibers. It has been especially hard to obtain deep shades, which require high affinity of the fiber for the dyestuff. The only way to achieve deep shades has been to increase the time and temperature of the dyeing process, with resulting injury to the fabrics. Although these fibers are very desirable for general textile use, the problem of dyeing them has been so serious as to imperil their commercial acceptance.

In the past, certain 2-arylazoimidazoles have been prepared, but these compounds do not have particularly good fastness to light and have not proved of value for commercial dyestuffs.

We have found that when 2-arylazoimidazoles are dialkylated to form 2-arylazoimidazolium compounds, one obtains bright dyestuffs of excellent light fastness and dyeing properties on polyacrylonitrile fibers.

Polymers containing major proportions of acrylonitrile may be dyed by the compounds of our invention. They may also contain basic comonomers, such as methylvinylpyridine and vinyl pyridine, or neutral comonomers such as methyl acrylate, vinyl acetate, and vinyl chloride. Of the polyacrylonitriles available commercially which can be used in our invention, one is 100% polyacrylonitrile, another is approximately 95% acrylonitrile and approximately 5% methyl acrylate, another has 89% of acrylonitrile, 6% methylvinylpyridine, and 5% vinyl acetate and still another has a composite of 94% acrylonitrile, 5% methylvinylpyridine, and 1% vinyl acetate. Polymers having as little as 50% acrylonitrile can be dyed by the dyes of our invention.

The compounds of our invention are prepared by coupling a diazo compound into an imidazole and alkylating the resulting azo compound. The alkylation can be carried out stepwise, first forming the 1-alkyl-2-arylazoimidazoles. It is often possible to carry out this first alkylation in a very convenient manner simply by dissolving the starting material in aqueous alkali and adding an alkylating agent such as dimethyl sulfate. The product is insoluble in alkali and separates out of the reaction mixture, generally in a form pure enough to be used directly as an intermediate. It is also possible to use an organic solvent such as alcohol, and an alkyl halide rather than a sulfate. In some cases it may be desirable to use a weak base such as sodium or potassium carbonate rather than the hydroxide; acetone and other ketones are often suitable solvents for use in this method.

The monoalkylated arylazoimidazoles thus obtained are then alkylated a second time to give the quaternized dyes of this invention. This second alkylation or quaternization is conveniently effected with an alkyl halide, sulfate, arylsulfonate, and the like in an organic solvent such as chloroform, benzene, toluene, carbon tetrachloride, and the like.

When the process is performed stepwise in this manner, it is possible to introduce a quaternizing group which differs from the substituent on the other nitrogen. However, it is often more convenient to carry out the double alkylation in one step. The quaternizing groups $R_1$ and $R_2$ may in general be various organic radicals. They may be alkyl, such as methyl, ethyl, propyl, butyl, lauryl, cetyl, octadecyl, cyanoalkyl such as cyanoethyl and the like; or they may be alkenyl groups such as allyl or crotyl, or an aralkyl such as benzyl or substituted benzyl, or a cycloalkyl group such as cyclohexyl, and the like. However, for convenience and cheapness the best alkylating agents are the lower alkyl groups such as methyl, ethyl, propyl, butyl, and the like.

The imidazoles to be used in the products of our invention are the simple monocyclic imidazoles which have an unsubstituted 2-position. Such compounds include imidazole itself, 4-methylimidazole, 4,5-dimethylimidazole, 5-amylimidazole, and the like. The 4- and 5-positions of the imidazole ring can thus be substituted by a lower alkyl group.

The diazotizable amine to be used in our invention are those having, ortho or para to the diazotizable amino group or in conjugation with it through further rings and bridges, an amino or alkylated amino group or an alkoxy group or a group readily convertible to one of these such as a nitro, acylamino, or hydroxy group. Examples of simple amines are o- and p-anisidine, o- and p-aminophenol, p-phenylenediamine, p-aminoacetanilide, p-aminobenzanilide, 4-phenylsulfonamidoaniline, 4-acetylamino, 1-aminonaphthalene, o- and p-nitroanilines, 4-methylaminoaniline, 4-ethylaminoaniline, 4-butylaminoaniline and the like. They may also be a more complicated amine such as a diamine (e.g. benzidine, tolidine, dianisidine, 4,4'-diaminostilbene,4,4'-diaminoazobenzene, benzidine sulfone) having both amino groups in conjugation with each other, in which case either mono or bis couplings with the imidazole can be made. They may also be aminoazo dyestuffs, although polyazo compounds within the scope of our invention can also be prepared by first coupling a protected diamine such as p-aminoacetanilide into the imidazole, hydrolyzing the protecting acetyl group, and diazotizing and coupling the resulting free amine into other coupling components having the desired amino or alkoxy group conjugated with the position of coupling. One restriction on the diazo component to be used should be noted. It should not have an acidic solubilizing group such as a sulfonic acid or carboxylic acid groups (even a phenolic hydroxyl must be alkylated in the final dyestuff) since the azo group is to become part of a cation and such an acid group would form a zwitterion or other undesirable form.

In the quaternized dyes of our invention the anion A⁻ may be any suitable anion of an acid, such as the bromide, iodide, chloride, sulfate, phosphate, nitrate, acetate, methosulfate, ethosulfate, perchlorate, and the like. These anions are water-solubilizing anions. In general, the anions of the strong mineral acids such as the halides, the sulfates, the nitrates and the perchlorates, or the anions of organic sulfonic acid such as the benzenesulfonate and the like are preferred, but the anions of organic acids such as the organic carboxylic acids are also usable.

The nature of the anion is unimportant except as to solubility, since the color is in the cation.

One important advantage of the azo dyes of our invention is the greatly improved light fastness which results from the alkylation of the imidazole ring. It is remarkable that such a simple process improves the properties of the dyestuffs in such a striking and unexpected manner. It is a further advantage of our invention that the quaternized dyes are lacking in pH sensitivity. It is a still further advantage of our invention that the quaternized dyes have a rather sharp absorption peak in their visual spectra; this is usually the criterion for a brilliant color. The simple unalkylated imidazole azo dyestuffs have a very broad and flat absorption peak. Even the monoalkylated imidazole azo dyes retain a broad absorption peak and consequently do not achieve the brilliance which is surprisingly achieved by quaternization.

This application is a continuation in part of our copending application, Serial No. 734,432, filed May 12, 1958, now abandoned.

Our invention can be illustrated by the following examples in which parts are by weight unless otherwise noted. Parts by volume are to parts by weight as milliliters are to grams.

EXAMPLE 1

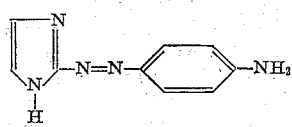

Thirty parts of p-aminoacetanilide are diazotized in the usual way in cold dilute hydrochloric acid by the addition of sodium nitrite. The resulting diazo solution is slowly added with stirring to a cold aqueous solution of 20 parts of imidazole containing enough sodium carbonate to maintain alkalinity throughout. After coupling is complete, the product is filtered, washed, and dried. If desired, it may be purified by crystallization from methyl cellosolve; it can also be used directly without purification as described below.

When, if in place of the p-aminoacetanilide, there is used an equivalent quantity of 2-methoxy-4-acetamidoaniline, 3-chloro-4-acetamidoaniline, 2',5'-diethoxy-4'-aminobenzanilide or monoacetylparatoluylene diamine, the corresponding arylazoimidazole is obtained by the same procedure.

EXAMPLE 2

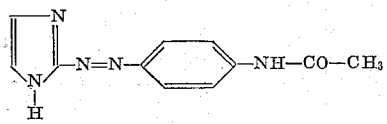

In the procedure of Example 1, the imiadzole is replaced by an equivalent quantity of 4-methylimidazole. The product is isolated in the same way.

EXAMPLE 3

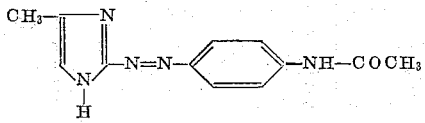

Fifteen parts of the product of Example 1 are refluxed in 600 parts by volume of water and 130 parts by volume of 5 N sodium hydroxide solution until hydrolysis is complete. After cooling, the product is isolated by acidification with acetic acid, followed by filtration and drying. It can be purified by crystallization from o-dichlorobenzene.

Similarly, the product from the coupling of monoacetyl paratoluylene diamine can be hydrolyzed by the same procedure.

EXAMPLE 4

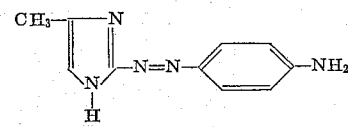

The procedure of Example 3 is carried out using the product of Example 2; the reaction product is isolated in a similar manner.

EXAMPLE 5

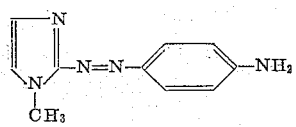

To a solution of 15 parts of the product of Example 3 in 900 parts by volume of water and 80 parts by volume of 5 N sodium hydroxide solution is added 11.5 parts of dimethyl sulfate. The mixture is stirred until methylation is complete, and the product then filtered. It can be purified by crystallization from chlorobenzene.

By the use of the above procedure the other 2-arylazoimidazoles disclosed in Examples 1 and 3 may be similarly monomethylated.

By the use of an equivalent quantity of diethyl sulfate instead of the dimethyl sulfate in the above procedure, the corresponding 1-ethyl compound is obtained.

EXAMPLE 6

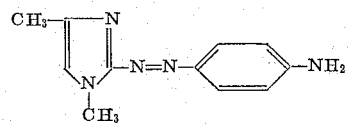

The product of Example 4 is methylated by the procedure described in Example 5.

EXAMPLE 7

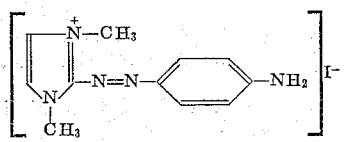

The product of Example 5 is stirred and refluxed in 100 parts by volume of benzene with 10–15 parts by volume of methyl iodide until quaternization is complete. The product is then filtered and may be crystallized from water. It dyes polyacrylonitrile fiber very bright attractive red-orange shades with excellent fastness properties.

The same procedure is used to quaternize the other monoalkyl 2-arylazoimidazoles dyes disclosed in Example 5 to produce the corresponding imidazolium dye-stuffs.

EXAMPLE 8

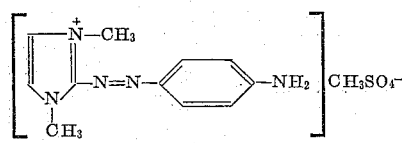

Eleven parts of the product of Example 5 are stirred and refluxed with 8.1 parts of dimethyl sulfate in 800 parts by volume of chloroform until quaternization is complete. The product is filtered and may be crystallized as purplish needles from propanol or nitromethane. It gives very attractive and fast red-orange dyeings on polyacrylonitrile fiber.

By metathesis, the above methosulfate can be converted into salts of other anions by salting with the corresponding sodium salt.

EXAMPLE 9

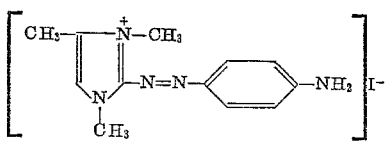

The product of Example 6 is quaternized according to the procedure of Example 7. The product is similar in dyeing properties.

EXAMPLE 10

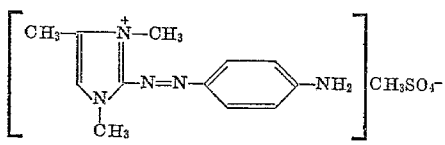

The product of Example 6 is quaternized according to the procedure of Example 8, giving a dye with similar properties.

EXAMPLE 11

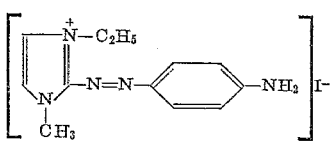

In the procedure of Example 7, the methyl iodide is replaced by ethyl iodide. The resulting dyestuff is similar in properties.

EXAMPLE 12

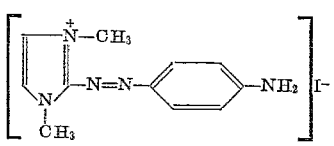

One part of the product of Example 3 is refluxed with 40 parts by volume of methanol and 5 parts by volume of methyl iodide until the reaction is complete. The product may be isolated by evaporation and crystallized from water. It is the same as the product of Example 7.

EXAMPLE 13

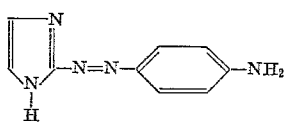

Seven parts of 2-(p-nitrophenylazo)imidazole and 18 parts of sodium sulfide nonahydrate are refluxed in 500 parts by volume of water and 500 parts by volume of ethanol until reduction is complete. The product is obtained by evaporation and may be purified by crystallization from o-dichlorobenzene or xylene. It is the same as the product of Example 3.

EXAMPLE 14

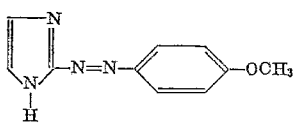

In the procedure of Example 1, the aminoacetanilide is replaced by an equivalent weight of p-anisidine. The resulting yellow product can be purified by crystallization from methylcyclohexane or a mixture of benzene and hexane.

When p-phenetidine is used in place of p-anisidine, the corresponding ethoxy compound is obtained.

EXAMPLE 15

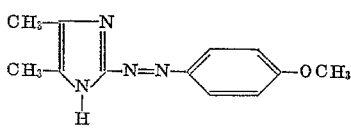

In the procedure of Example 14, the imidazole is replaced by an equivalent weight of 4,5-dimethylimidazole. The product is obtained in a similar fashion.

EXAMPLE 16

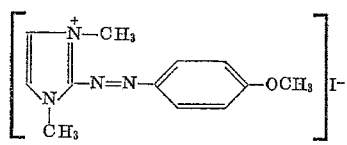

A solution of 2.7 parts of the product of Example 14 in 100 parts by volume of water and 15 parts by volume of 5 N sodium hydroxide is treated with 1.8 parts of dimethyl sulfate. The product separates rapidly. After the reaction is complete, the product is dissolved in chloroform, dried over anhydrous potassium carbonate, and quaternized by refluxing with 10–20 parts by volume of methyl iodide until the reaction is complete. The product is filtered; it crystallizes as purplish needles from amyl alcohol. It gives bright attractive yellow dyeings on polyacrylonitrile fiber, with good all-round properties.

The similar ethoxy dye is obtained by substituting the corresponding 2-(p-ethoxyphenylazo) imidazole for the above starting material.

EXAMPLE 17

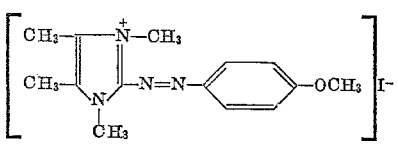

The product of Example 15 is used in the procedure of Example 16. The resulting dyestuff has similar properties; its dyeings are much faster to light than those obtained from the intermediate before quaternization or methylation.

EXAMPLE 18

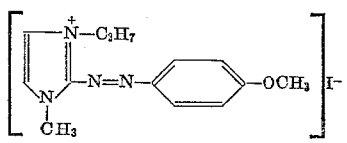

In the procedure of Example 16, the methyl iodide is replaced by propyl iodide. The resulting dyestuff has similar properties. Amyl bromide may be used similarly.

EXAMPLE 19

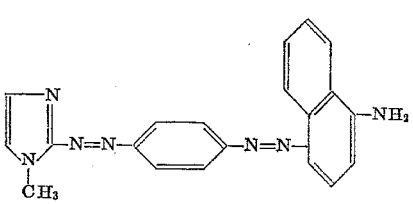

One part of the product of Example 5 is dissolved in a solution of 9 parts by volume of concentrated sulfuric acid and 5 parts of water, cooled in an ice bath and then diazotized by the addition of 0.35 part sodium nitrite dissolved in 4 parts of water. After completion of diazotization, a solution of 0.80 part alpha-naphthylamine in 10 parts by volume of alcohol is added. The reaction mixture is then buffered by the addition of sodium acetate. After completion of coupling, the product is filtered and dried. It can be crystallized from alcohol.

EXAMPLE 20

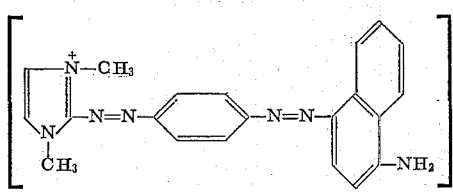

The product of Example 19 is quaternized by refluxing with 10 parts by volume of methyl iodide in 60 parts by volume of chloroform. The product is filtered off after completion of the reaction, and may be purified by crystallization from water. It gives violet dyeings on polyacrylonitrile fiber with good all-round properties.

EXAMPLE 21

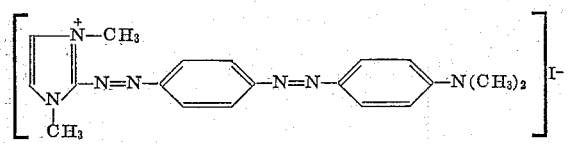

In the procedure of Example 19, the naphthylamine is replaced by an equivalent quantity of dimethylaniline. The product is quaternized as described in Example 20. It gives attractive reddish violet shades on polyacrylonitrile fibers.

EXAMPLE 22

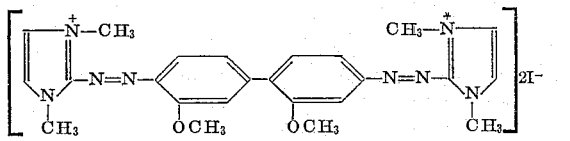

Dianisidine is tetrazotized in the usual manner, and coupled with two moles of imidazole by the procedure described in Example 1. The product may be purified by dissolving in dilute sulfuric acid, filtering, and precipitating with ammonia. It is methylated by dissolving 4.85 parts in 125 parts by volume of alcohol containing 20 parts by volume of 5 N sodium hydroxide solution, adding 6.0 parts by volume of dimethyl sulfate, and refluxing until the reaction is complete. The product is obtained by dilution and cooling, and may be purified by crystallization from dioxan. On quaternization with methyl iodide it gives reddish brown shades on polyacrylonitrile fiber.

In place of the dianisidine above, equivalent amounts of such diamines as p-phenylenediamine, benzidine, tolidine, benzidine sulfone, 4,4'-diamino stilbene or 4,4'-diaminobenzophenone are used.

EXAMPLE 23

Dyeing of polyacrylonitrile 0.2 of the dye of Example 7, on weight of fiber, is dissolved in water and diluted to 200 parts. The pH is adjusted as indicated in A, B, and C below. Five grams acrylic fibers having a major proportion of acrylonitrile are added. The dye bath is brought to boil in 10-20 minutes and boiling is continued one hour. The fiber is rinsed with cold water and then soaped with 0.1% neutral soap solution, rinsed and dried.

A. 2% acetic acid, 0.3 sodium acetate.
B. Neutral; no additives.
C. 1% sulfuric acid.

All percents are on the weight of the fiber or fabric.

By methods A, B or C, a bright orange is obtained on a polyacrylonitrile fiber comprising 96% acrylonitrile and 4% methyl acrylate and on one comprising 89% acrylonitrile, 5% vinyl acetate and 6% vinylpyridine.

EXAMPLE 24

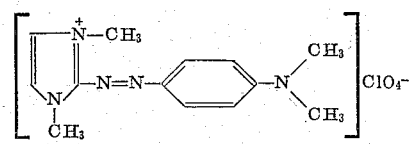

Paraformaldehyde (2.7 parts) is dissolved in 50 parts by volume of 98% formic acid. To this is then gradually added 10.5 parts of the product of Example 8. The mixture is stirred on a water bath at 90–100° C. until the reaction is substantially complete. The reaction mixture is then diluted with water and cooled. Perchloric acid is added. The precipitated wine-colored salt is isolated by filtration and purified by recrystallization. The perchlorate can be converted to the bromide, iodide, or iodate by salting from water with the corresponding sodium salt. These salts dye polyacrylonitrile fibers by the procedures of Example 27 a brilliant red shade.

EXAMPLE 25

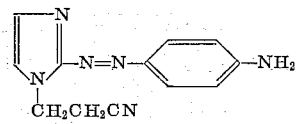

A solution of 1.9 parts of the product of Example 3, 0.6 part of acrylonitrile, and a small amount of tetramethylguanidine in 150 parts by volume of ethanol is refluxed until the reaction is complete. The solvent is then evaporated. The brick red product is readily purified by crystallization from xylene.

EXAMPLE 26

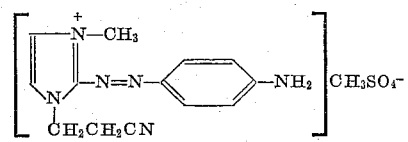

A solution of 0.42 part of the product of Example 25 in 125 parts by volume of chloroform is treated with 0.27 part of dimethyl sulfate and stirred and refluxed until the reaction is complete. The product is filtered and washed. It may be crystallized from propanol. It gives bright orange dyeings on polyacrylonitrile fiber.

EXAMPLE 27

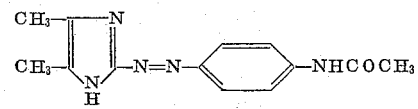

The diazo is prepared in the usual way from 7.5 parts of p-aminoacetanilide. This is added slowly to a cold aqueous solution of 5.0 parts of 4,5-dimethylimidazole containing sufficient sodium carbonate to maintain alkalinity throughout. The product is then filtered, washed, and dried. It may be crystallized from dilute alcohol.

EXAMPLE 28

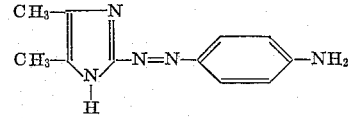

Three parts of the product of Example 27 is refluxed in 25 parts by volume of 5 N sodium hydroxide, 175 parts by volume of water, and 25 parts by volume of alcohol until hydrolysis is complete. The solution is then neutralized with acetic acid, and the purple product filtered, washed, and dried. It may be purified by crystallization from benzene or toluene.

EXAMPLE 29

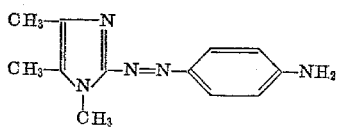

A solution of 1.8 parts of the product of Example 28 in 200 parts by volume of water and 25 parts by volume of 5 N sodium hydroxide is treated at 80–90° with 1.0 parts by volume of dimethyl sulfate and stirring until the reaction is complete. The product is isolated by filtration and drying. A red brown solid is obtained by recrystallization from xylene.

EXAMPLE 30

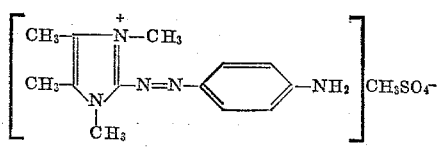

A solution of 7.0 parts of the product of Example 29 in 350 parts by volume of chloroform, is treated with 3.3 parts by volume of dimethyl sulfate. The reaction is completed by gentle warming. The product is filtered. It crystallizes from ethanol as violet needles, and gives bright reddish orange dyeings on polyacrylonitrile fiber which are much faster to light than those obtained from the products of Examples 27 and 28.

EXAMPLE 31

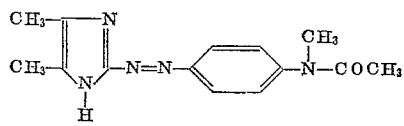

p-Amino-N-methylacetanilide is diazotized in the usual way and coupled with 4,5-dimethylimidazole by the procedure of Example 27. The product crystallizes from dilute ethanol as orange platelets.

EXAMPLE 32

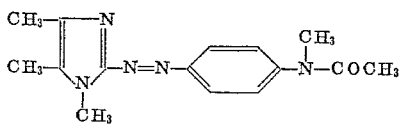

To a solution of 2.8 parts of the product of Example 31 in 100 parts by volume of water and 25 parts by volume of 5 N sodium hydroxide there is added 1.5 parts by volume of dimethyl sulfate. The yellow product separates rapidly and is filtered and washed. It may be crystallized from toluene.

EXAMPLE 33

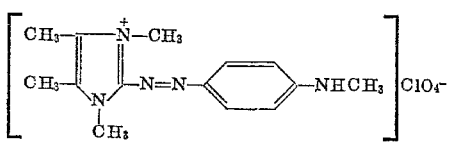

A solution of 13. parts of the product of Example 32 and 1.1 parts of methyl p-toluenesulfonate in 70 parts by volume of benzene is stirred and refluxed until quaternization is complete. The product is filtered, dried, and hydrolyzed by refluxing in 1.5 parts by volume of 12 N hydrochloric acid and 15 parts by volume of water. Addition of perchloric acid to the blood red solution precipitates the perchlorate of the product as purplish needles, which may be crystallized from propanol. The product gives bright pink shades on polyacrylonitrile fiber.

EXAMPLE 34

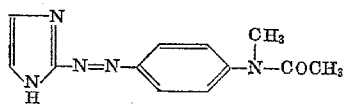

p-Amino-N-methylacetanilide (4.5 parts) is dissolved in dilute hydrochloric acid and diazotized in the usual way by the addition of sodium nitrite solution in the cold. The diazo is then added with stirring to an aqueous solution of 7.0 parts of imidazole containing sodium carbonate sufficient to maintaining alkalinity throughout. The orange product is filtered and washed thoroughly. It crystallizes from toluene as a brown solid.

EXAMPLE 35

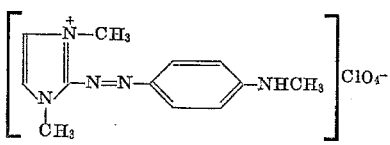

A solution of 0.90 part of the product of Example 34 in 6 parts by volume of water and 3 parts by volume of 5 N sodium hydroxide is treated with 0.50 part by volume of dimethyl sulfate. After completion of the reaction, the methylation product is extracted with chloroform, dried, and quaternized by the addition of 0.50 part by volume of dimethyl sulfate. The quaternary salt is extracted with dilute hydrochloric acid hydrolyzed by heating and precipitated as the perchlorate by addition of perchloric acid. It crystallizes from propanol as violet needles, and gives bright scarlet dyeings on polyacrylonitrile fiber, with excellent all-around fastness properties.

EXAMPLE 36

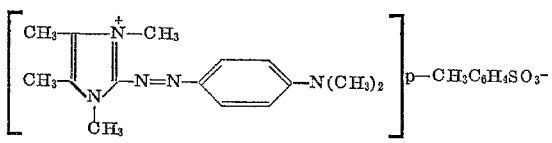

A solution of 1.7 parts of N,N-dimethyl-p-phenylenediamine monohydrochloride in 10 parts by volume of 12 N hydrochloric acid and 20 parts by volume of water is diazotized in the usual way with 0.90 part of sodium nitrite. After completion of diazotization, a solution of 1.0 part of 4,5-dimethylimidazole in 20 parts by volume of ethanol is added, and the solution cooled to −20 to −30°. With stirring, 5 N sodium hydroxide is added slowly until coupling is complete. The product is filtered and may be crystallized from xylene. It is methylated with dimethyl sulfate in hot aqueous sodium hydroxide, and the product is quaternized with methyl p-toluene-sulfonate by refluxing in a toluene solution of the latter. It crystallizes as dark blue needles from ethanol, and dyes polyacrylonitrile bright bluish-red shades with excellent working and fastness properties.

We claim:
1. A compound of the formula:

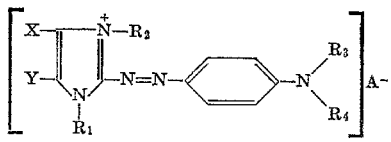

wherein $R_1$ and $R_2$ are each selected from the group consisting of lower alkyl and lower cyanoalkyl; X and Y are each selected from the group consisting of hydrogen and lower alkyl; $R_3$ and $R_4$ are each selected from the group consisting of hydrogen and lower alkyl; and $A^-$ is a water-solubilizing anion.

2. The compounds of the formula:

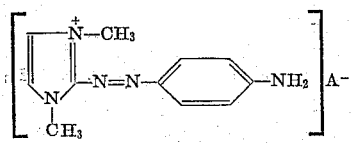

in which A⁻ is a water-solubilizing anion.

3. The compounds of the formula:

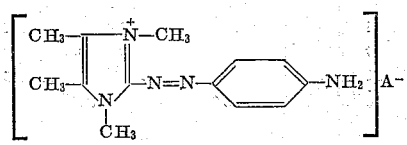

in which A⁻ is a water-solubilizing anion.

4. The compounds of the formula:

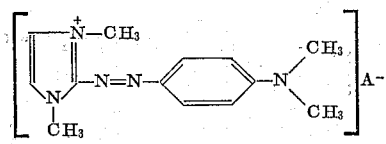

in which A⁻ is a water-solubilizing anion.

5. The compounds of the formula:

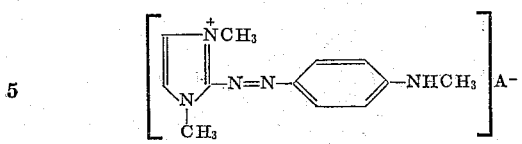

in which A⁻ is a water-solubilizing anion.

6. The compound of the formula:

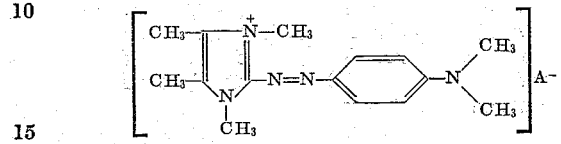

in which A⁻ is a water-solubilizing anion.

References Cited in the file of this patent
UNITED STATES PATENTS

| | | |
|---|---|---|
| 2,883,373 | Bossard et al. | Apr. 21, 1959 |
| 2,893,816 | Tsang et al. | July 7, 1959 |

FOREIGN PATENTS

| | | |
|---|---|---|
| 212,751 | Australia | Feb. 6, 1958 |
| 1,000,119 | Germany | Jan. 3, 1957 |